(12) United States Patent
Suda et al.

(10) Patent No.: US 11,578,235 B2
(45) Date of Patent: Feb. 14, 2023

(54) CERIUM BASED PARTICLES

(71) Applicant: RHODIA OPERATIONS, Paris (FR)

(72) Inventors: Eisaku Suda, Tokushima (JP); Manabu Yuasa, Tokushima (JP); Réka Toth, Paris (FR)

(73) Assignee: RHODIA OPERATIONS, Paris (FR)

( * ) Notice: Subject to any disclaimer, the term of this patent is extended or adjusted under 35 U.S.C. 154(b) by 188 days.

(21) Appl. No.: 16/621,404

(22) PCT Filed: Jun. 11, 2018

(86) PCT No.: PCT/EP2018/065380
§ 371 (c)(1),
(2) Date: Dec. 11, 2019

(87) PCT Pub. No.: WO2018/229005
PCT Pub. Date: Dec. 20, 2018

(65) Prior Publication Data
US 2020/0198982 A1    Jun. 25, 2020

(30) Foreign Application Priority Data

Jun. 15, 2017  (EP) .................................... 17176255

(51) Int. Cl.
C09G 1/02        (2006.01)
C01F 17/235      (2020.01)

(52) U.S. Cl.
CPC .............. C09G 1/02 (2013.01); C01F 17/235 (2020.01); *C01P 2004/03* (2013.01); *C01P 2004/64* (2013.01); *C01P 2004/90* (2013.01); *C01P 2006/12* (2013.01); *C01P 2006/16* (2013.01)

(58) Field of Classification Search
CPC ........ C09G 1/02; C01F 17/235; C01F 17/241; C01F 17/206; C01P 2004/03; C01P 2004/64; C01P 2004/90; C01P 2006/12; C01P 2006/16; C01P 2002/54; C01P 2004/38; C01P 2004/50; C01P 2004/51; C01P 2004/52; C01P 2004/62; C09K 3/1436
See application file for complete search history.

(56) References Cited

U.S. PATENT DOCUMENTS

| 4,657,644 A | 4/1987 | Bachot et al. |
| 6,589,496 B1 * | 7/2003 | Yabe ..................... A61Q 17/04 |
| | | 423/263 |
| 2010/0072417 A1 | 3/2010 | Criniere |

(Continued)

FOREIGN PATENT DOCUMENTS

| FR | 2570087 A1 | 3/1986 |
| IN | 4103CH2013 A | 8/2015 |

(Continued)

OTHER PUBLICATIONS

Stephen Brunauer, et al., "Adsorption of Gases in Multimolecular Layers", J. Am. Chem. Soc., 1938, vol. 60, pp. 309-319.

*Primary Examiner* — Anthony J Zimmer
(74) *Attorney, Agent, or Firm* — Osha Bergman Watanabe & Burton LLP

(57) ABSTRACT

The present invention relates to cerium-based particles and their use as a component of a composition for polishing. The present invention also relates to the method of preparation of the cerium-based particles.

19 Claims, 4 Drawing Sheets

(56) References Cited

U.S. PATENT DOCUMENTS

2010/0329954 A1    12/2010   Yokota et al.
2016/0312069 A1    10/2016   Suda et al.
2017/0021095 A1    1/2017   Utz
2017/0210958 A1    7/2017   Shinoda et al.

FOREIGN PATENT DOCUMENTS

| WO | 2008/043703 A2 | 4/2008 |
| WO | 2013/067696 A1 | 5/2013 |
| WO | 2015/091495 A1 | 6/2015 |
| WO | 2015/197656 A1 | 12/2015 |
| WO | 2016/006553 A1 | 1/2016 |
| WO | 2016/140968 A1 | 9/2016 |
| WO | 2016/141259 A1 | 9/2016 |
| WO | 2016/141260 A1 | 9/2016 |

\* cited by examiner

CERIUM BASED PARTICLES

This application is a U.S. national phase entry under 35 U.S.C. § 371 of International Application No. PCT/EP2018/065380, filed on Jun. 11, 2018, which claims priority to European Application No. 17176255.2, filed on Jun. 15, 2017. The entire contents of these applications are explicitly incorporated herein by this reference.

The present invention relates to cerium-based particles and their use as a component of a composition for polishing, in particular a CMP composition. The present invention also relates to the method of preparation of the cerium-based particles. This application claims priority to European application No. 17176255.2—filed Jun. 15, 2017—, the whole content of this application being incorporated herein by reference for all purposes.

TECHNICAL PROBLEM

Thanks to their good abrasive properties, cerium-based particles are known to be ingredients in abrasive formulations used for polishing inorganic surfaces like glass or surfaces used in the electronic industry. The abrasive formulations must exhibit a high degree of removal of material from the surfaces, which reflects their abrasive capacity. They must also have a defectuosity which is as low as possible; the term "defectuosity" is intended to mean in particular the amount of scratches exhibited by the surface once treated with the formulation.

The cerium-based particles are usually commercialized in the form of dispersions. The dispersions usually consist of particles, the size of which is less than 300 nm. The presence of particles that are too fine reduces the abrasive capacity of the particles and particles that are too large can contribute to an increase in the defectuosity.

There is still a need of cerium-based particles having improved abrasive properties. The cerium based particles of the invention aim at addressing this technical problem.

BRIEF DESCRIPTION OF THE INVENTION

The invention relates to particles of a mixed oxide of cerium and of lanthanum characterized:
- by a molar ratio La/(La+Ce) comprised between 0.01 and 0.15, more particularly between 0.01 and 0.12;
- by a specific surface area (BET) between 3 and 14 m$^2$/g, more particularly between 7 and 13 m$^2$/g, even more particularly between 8 and 12 m$^2$/g;
- in that they are substantially cubic.

The invention also relates to particles of a mixed oxide of cerium and of lanthanum characterized:
- by a molar ratio La/(La+Ce) comprised between 0.01 and 0.15, more particularly between 0.01 and 0.12;
- by a specific surface area (BET) between 3 and 14 m$^2$/g, more particularly between 7 and 13 m$^2$/g, even more particularly between 8 and 12 m$^2$/g;
- in that the images of the particles obtained by SEM exhibit 4 sides having substantially the same length and are such that the adjacent sides of these 4 sides form an angle which is substantially equal to 90°.

The invention also relates to a dispersion of the above-disclosed particles in a liquid medium.

TECHNICAL BACKGROUND

WO 2015/091495 discloses liquid suspension of cerium oxide particles. There is no mention of cubic particles made of a mixed oxide of cerium and lanthanum.

WO 2015/197656 discloses metal doped cerium oxide particles. The doping element M is selected in a long list of elements, including lanthanum. The specific surface area after calcination at 300° C. is comprised between 20 and 100 m$^2$/g, which means that the specific surface area of the fresh product is likely to be higher than 20 m$^2$/g. There is no mention of cubic particles with a specific surface area (BET) between 3 and 14 m$^2$/g. The method of preparation is different than the method of the invention as the Ce$^{IV}$/Ce total ratio is higher. Moreover, the conditions of the aging step are not given.

WO 08043703 discloses a suspension of cerium oxide particles in a liquid phase, said particles being secondary particles having an average size of at most 200 nm, and said secondary particles comprising primary particles whose average size is at most 100 nm with a standard deviation of at most 30% of the value of said average size of said primary particles. The particles are based on cerium oxide only.

WO 2013/067696 discloses a polishing composition comprising cerium-based particles, a polyacrylate salt, an acid ester, a defoamer agent and an optional liquid medium. The cerium-based particles are based on cerium oxide, lanthanum-cerium oxide, lanthanum-cerium-praseodymium oxide, lanthanum-cerium-praseodymium-neodymium oxide or other doped cerium oxides. There is no mention of the size of the particles.

WO 2015/091495 discloses a suspension of cerium oxide particles in a liquid phase, in which said particles comprise secondary particles comprising primary particles, wherein said secondary particles have an average size D50 comprised between 105 and 1000 nm, with a standard deviation comprised between 10 and 50% of the value of said average size of said secondary particles; and said primary particles have an average size D50 comprised between 100 and 300 nm, with a standard deviation comprised between 10 and 30% of the value of said average size of said primary particles. The particles are based on cerium oxide only. The process of preparation of the cerium oxide particles is based on a precipitation step using a solution comprising Ce$^{III}$ and Ce$^{IV}$ with a ratio Ce$^{III}$/Ce$^{IV}$ between 1/10 000 and 1/500 000 and a base, and a heat treatment step.

FIGURES

FIGS. 3 to 7 correspond to pictures of the particles of the comparative examples 1-3 and examples 1-2.

All the pictures on these figures were obtained with a SEM S-5500 of Hitachi High-Technologies Corporation.

Figure 8:
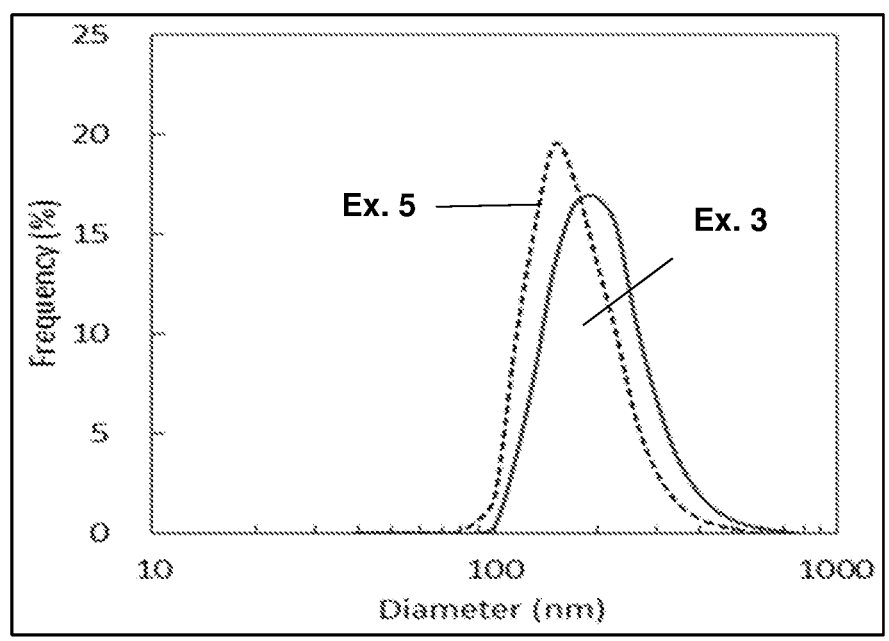

FIG. 8 correspond to the distributions of sizes obtained with a laser diffraction of th dispersion of examples 3 and 5. As can be seen, the distributions are monomodal.

DESCRIPTION OF THE INVENTION

The invention relates to particles of a mixed oxide of cerium and of lanthanum characterized by a molar ratio La/(La+Ce) comprised between 0.01 and 0.15, more particularly between 0.01 and 0.12, and exhibiting a specific surface area (BET) between 3 and 14 m$^2$/g, more particularly between 7 and 13 m$^2$/g, even more particularly between 8 and 12 m$^2$/g.

The particles of the invention are characterized by their shape which is now detailed in the lines below.

The particles may be described as substantially cubic.

The particles can be observed on pictures obtained by SEM (Scanning Electron Microscopy). The observation of the pictures must be made with a magnitude and an appliance which make it possible to identify clearly the shape of the particles. It is therefore preferable to clearly distinguish the particles individually. The magnitude used for the observation may for instance range from ×40 000 to ×500 000. A field emission-type SEM S-5500 of Hitachi High-Technologies Corporation may be used.

The images obtained by SEM of the cerium-based particles exhibit 4 sides having substantially the same length. Moreover, the images are such that the adjacent sides of these 4 sides form an angle which is substantially equal to 90°. The angle formed by the adjacent sides of these 4 sides may be comprised between 88° and 92° or between 89° and 91°.

The observation by SEM is made on a preferably high number of particles so that it is possible to perform a statistical analysis. This is usually accomplished on more than one picture of the same sample of the cerium-based particles. The number of particles for the observation may preferably be higher than 200. The particles retained are such that their images are well visible on the picture(s). More particularly, the number of particles retained exhibiting 4 sides having substantially the same length and such that the adjacent sides of these 4 sides form an angle which is substantially equal to 90° correspond to at least 80.0%, more particularly at least 90.0%, even more particularly at least 95.0% of the particles. Some of the particles may exhibit some defects either on their surface and/or one of their corners (see eg FIG. 1). These particles can nonetheless be retained in the statistical analysis.

The particles of the invention are also characterized by a particular composition. The cerium-based particles are made of a mixed oxide of cerium and lanthanum. The mixed oxide comprises the elements Ce and La but it may also additionally comprise some impurities. The impurities may stem from the raw materials or starting materials used in the process of preparation of the mixed oxide. The total proportion of the impurities is generally lower than 0.2% by weight with respect to the mixed oxide. In this application, the residual nitrates are not considered as impurities.

Figure 1:
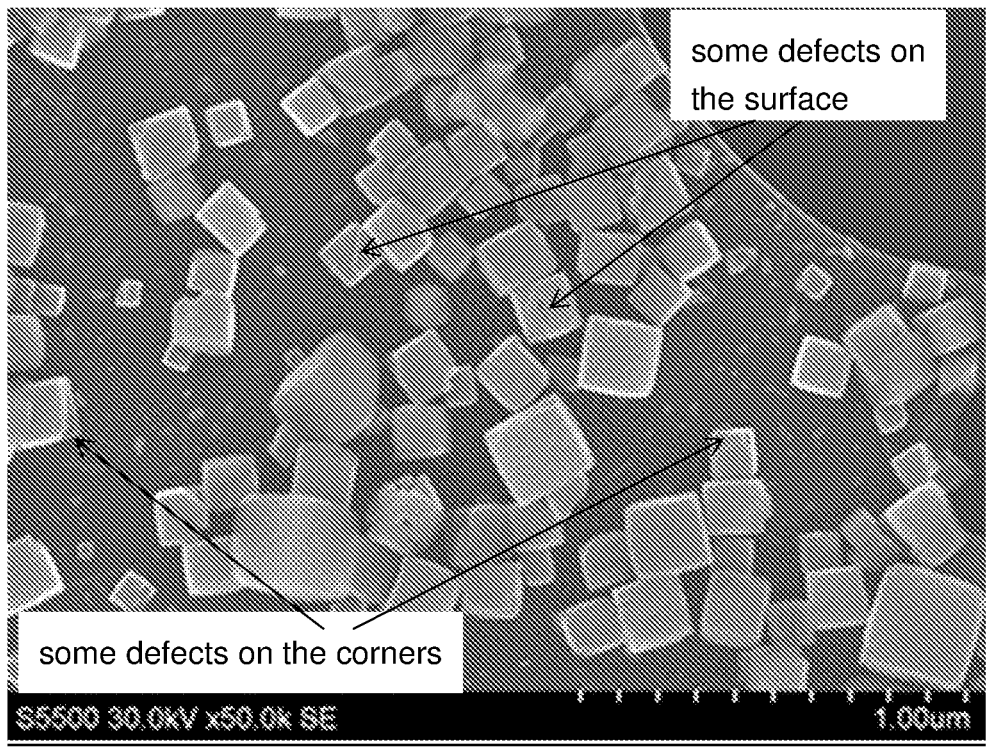
FIG. 1 illustrates particles according to the invention made of a mixed oxide of cerium and lanthanum.
Figure 2:
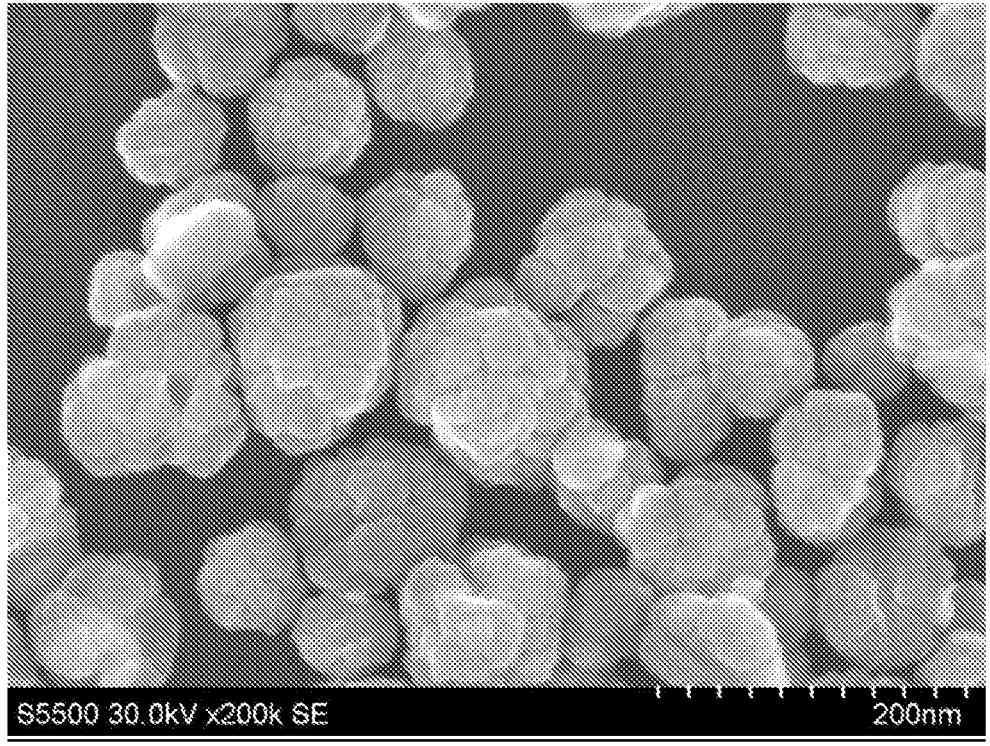
FIG. 2 illustrates particles of cerium and of an element other than La that do not correspond to the invention.

Lanthanum makes it possible to obtain the cubic-shaped particles (see the particles of FIG. 1 made of a mixed oxide of cerium and lanthanum and the particles of FIG. 2 made of a mixed oxide of cerium and an element other than La). The molar ratio La/(La+Ce) is comprised between 0.01 and 0.15, more particularly between 0.01 and 0.12. This ratio may be comprised between 0.01 and 0.04, more particularly between 0.02 and 0.03. It may also be comprised between 0.08 and 0.12, more particularly between 0.09 and 0.11.

The mixed oxide may be a solid solution. In that case, the lanthanum atoms are intimately diffused into the cerium oxide crystalline structure. The solid solution exhibits a symmetrical XRD pattern and the reflexion of the peak located at 2θ between 27.0° and 29.0° is shifted to a lower angle than pure ceria. The solid solution is obtained when the temperature of the aging substep (ii) is higher than 60° C. Thus, the term "solid solution" as used in this invention means that the XRD shows only the XRD pattern of the cerium oxide crystal structure with or without shifts in the individual peaks but without presence of additional peaks which would show the presence of other phases.

The cerium-based particles also comprise hydroxyl groups (OH groups) on their surface. The OH/RE$_{surface}$ molar ratio may be comprised between 0.100 and 0.600. OH is the number of moles of NaOH needed to neutralize a dispersion of the cerium-based particles with a proportion of 2.7 wt % of cerium-based particles from pH 5.0 to pH 9.0. The weight of the cerium-based particles is m.

RE$_{surface}$ is determined through the following equation:

$$RE\ \text{surface} = \frac{SSA \times 2 \times m}{\text{surface area of crystal mesh} \times NA}$$

m: weight of the cerium-based particles;
NA: Avogadro number equal to $6.0 \times 10^{23}$
surface area of the crystal mesh = 29.16 Å$^2$ The hydroxyl groups present on the surface may be of different type: monodentate (pKa=24.0), bidentate (pKa=14.8) or tridentate (pKa=5.5). The cerium-based particles may comprise tridentate groups. The amount of tridentate groups may be at least $2.0 \times 10^{-5}$ mol/m$^2$. It may be lower than $6.0 \times 10^{-5}$ mol/m$^2$.

The cerium-based particles exhibits a specific surface area comprised between 3 and 14 m$^2$/g, more particularly between 7 and 13 m$^2$/g, even more particularly between 8 and 12 m$^2$/g. The specific surface area is determined on a powder by adsorption of nitrogen by the Brunauer-Emmett-Teller method (BET method). The method is disclosed in standard ASTM D 3663-03 (reapproved 2015). The method is also described in the periodical "The Journal of the American Chemical Society, 60, 309 (1938)". The specific surface area is determined automatically with an appliance TriStar 3000 of Micromeritics according to the guidelines of the constructor. Prior to the measurement, the samples in the form of powders are degassed under static air by heating at a temperature of at most 210° C. to remove the adsorbed species.

The cerium-based particles may also be characterized by various parameters that relate to a distribution of the size of the particles that are disclosed below. Said parameters are based on distributions by volume and not by number.

The cerium-based particles may exhibit an hydrodynamic mean diameter Dh comprised between 100 nm and 1000 nm, more particularly between 100 nm and 500 nm, even more particularly between 100 nm and 250 nm, even more particularly between 150 nm and 250 nm. Dh may preferably be higher than 150 nm, more particularly higher than 200 nm. Dh is determined by dynamic light scattering (DLS) and corresponds to a median diameter (d50). This technique allows measurement of a hydrodynamic diameter Dh of the solid objects, the value of which is affected by the presence of aggregates of particles. The measurement is usually performed on a dispersion of the particles in water. Dh is determined with the appliance Zetasizer Nano-ZS of Marvern following the guidelines of the constructor. The sample usually needs to be diluted in deionized water. A dilution factor of ×1,000,000 may be applied.

Laser diffraction may also be used to characterize the cerium-based particles. Laser particle sizer like Horiba LA-910 may be used following the guidelines of the constructor. For the measurement, a relative refractive index of 1.7 is used. From the distribution obtained with laser diffraction, various parameters usually used in statistics like D10, D50, D90, D99 and dm may be deducted.

The cerium-based particles may exhibit a D50 comprised between 100 nm and 700 nm, more particularly between 100 nm and 200 nm. D50 may be comprised between 100 nm and 150 nm or between 150 nm and 200 nm. D50 is the median diameter determined from a distribution obtained by laser diffraction.

In general, the distribution obtained is monomodal (only one peak on the distribution).

The cerium-based particles may exhibit a D10 comprised between 80 nm and 400 nm, more particularly between 80 nm and 150 nm. D10 may usually be less than 130 nm. D10 may preferably be higher than 100 nm. D10 is the diameter determined from a distribution obtained by laser diffraction for which 10% of the particles have a diameter of less than D10.

The cerium-based particles may exhibit a D90 comprised between 150 nm and 1200 nm, more particularly between 150 nm and 300 nm, even more particularly between 200 nm and 300 nm. D90 is the diameter determined from a distribution obtained by laser diffraction for which 90% of the particles have a diameter of less than D90. For cerium-based particles having been subjected to a mechanical treatment of deagglomeration, D90 is less than 300 nm.

The cerium-based particles may exhibit a low dispersion index. The "dispersion index" is defined by the following formula $\sigma/m=(D90-D10)/2D50$. $\sigma/m$ may be lower than 0.60, more particularly lower than 0.30. The cerium-based particles having been subjected to the mechanical treatment of deagglomeration may exhibit a dispersion index lower than 0.30.

Moreover, D90/D50 is usually comprised between 1.30 and 2.00.

The cerium-based particles may exhibit a D99 comprised between 150 nm and 3000 nm, more particularly between 200 nm and 2000 nm, even more particularly between 200 nm and 1800 nm. D99 may preferably be less than 600 nm, more particularly less than 500 nm, even more particularly less than 400 nm. D99 is the diameter determined from a distribution obtained by laser diffraction for which 99% of the particles have a diameter of less than D99. For cerium-based particles having been subjected to a mechanical treatment of deagglomeration, D99 is less than 600 nm, more particularly less than 500 nm, even more particularly less than 400 nm.

The minimal values of Dh, D10, D50, D90, D99 may each be selected in the examples of the present patent application. The maximal values of Dh, D10, D50, D90, D99 may each be selected in the examples of the present patent application.

About the Method of Preparation of the Cerium-Based Particles

The method of preparation of the cerium-based particles is based on the precipitation of nitrates of cerium and of lanthanum. The method comprises the following steps:

(a) contacting under an inert atmosphere, an aqueous solution of a base and an aqueous solution comprising $NO^{3-}$, $Ce^{III}$, $Ce^{IV}$ and $La^{3+}$ wherein the $Ce^{IV}$/total Ce molar ratio is comprised between 1/500 000 and 1/4000;

(b) subjecting the mixture obtained in step (a) to a thermal treatment under an inert atmosphere;

(c) the mixture obtained at the end of step (b) may optionally be acidified;

(d) the solid material obtained at the end of step (b) or step (c) is washed with water;

(e) the solid material obtained at the end of step (d) is optionally subjected to a mechanical treatment to deagglomerate the particles.

The starting solution used in step (a) is prepared by mixing aqueous solutions of nitrates of cerium and of lanthanum. The aqueous solution comprises $NO^{3-}$, $Ce^{3+}$, $Ce^{4+}$ and $La^{3+}$ and is characterized by a $Ce^{IV}$/total Ce molar ratio comprised between 1/500 000 and 1/4000. This moral ratio may generally be between 1/90 000 and 1/100 000. The $Ce^{IV}$/total Ce molar ratio used in the examples may be used.

It is advantageous to use salts and ingredients of a high purity. The purity of the salts may be at least 99.5 wt %, more particularly of at least 99.9 wt %.

An aqueous ceric nitrate solution obtained by the reaction of nitric acid with an hydrated ceric oxide may be used in the method of preparation. The ceric oxide is prepared conventionally by reaction of a solution of a cerous salt and of an aqueous ammonia solution in the presence of aqueous hydrogen peroxide to convert $Ce^{III}$ cations into $Ce^{IV}$ cations. It is also particularly advantageous to use a ceric nitrate solution obtained according to the method of electrolytic oxidation of a cerous nitrate solution as disclosed in FR 2570087. A solution of ceric nitrate obtained according to the teaching of FR 2570087 may exhibit an acidity of around 0.6 N.

Cerium IV is provided by a salt which may be cerium IV nitrate or cerium ammonium nitrate.

The amount of nitrate ions in the aqueous solution used in step (a), expressed by the $NO^{3-}/Ce^{III}$ molar ratio is generally between 1/3 and 5/1. The acidity of the aqueous solution used in step (a) is preferably comprised between 0.8 N and 12.0 N.

The amount of free oxygen in the starting solution should be carefully controlled and minimized. To this end, the starting solution may be degassed by bubbling with an inert gas. The term "inert gas" or "inert atmosphere" is intended to mean an atmosphere or a gas free of oxygen, it being possible for the gas to be, for example, nitrogen or argon.

Step (a) consists in reacting the aqueous solution with an aqueous solution of the base. Products of the hydroxide type can in particular be used as base. Mention may be made of alkali metal or alkaline earth metal hydroxides and aqueous ammonia. Secondary, tertiary or quaternary amines can also be used. The aqueous solution of the base can also be degassed beforehand by bubbling with an inert gas. Step (a) may be be carried by introducing the aqueous solution into an aqueous solution of the base. Step (a) is preferably carried out under an inert atmosphere, notably either in a closed reactor or in a semi-closed reactor with sweeping with the inert gas. The bringing into contact is generally carried out in a stirred reactor. The amount of the base used in step (a), expressed by the molar ratio base/(Ce+La), is preferably comprised between 8.0 and 30.0. This ratio may preferably be higher than 9.0.

Step (a) generally carried out at a temperature comprised between 5° C. and 50° C. This temperature may be 20-25° C.

Step (b) is a thermal treatment of the reaction medium obtained at the end of the preceding step. It consists in (i) an heating substep and (ii) in an aging substep. The heating substep (i) consists in heating the medium at a temperature which is generally comprised between 75° C. and 95° C., more particularly between 80° C. and 90° C., even more particularly between 85° C. and 90° C.

The aging substep (ii) consists in maintaining the medium at a temperature comprised between 75° C. and 95° C., more particularly between 80° C. and 90° C., even more particularly between 85° C. and 90° C. The duration of the aging substep (ii) is between 2 hours to 20 hours. As a rule of thumb, the higher the temperature of the aging step, the lower the duration of the agin substep. For instance, when the temperature of the aging substep is between 85° C. and 90° C., eg. 88° C., the duration of the aging substep may be between 2 hours and 15 hours, more particularly between 4 hours and 15 hours. When the temperature of the aging substep is between 75° C. and 85° C., eg. 80° C., the duration of the aging substep may be between 15 hours and 30 hours.

During step (b), the oxidation of $Ce^{III}$ to $Ce^{IV}$ occurs. This step may also be carried out under an inert atmosphere, the description with respect to this atmosphere for step (a) being applied similarly here. Similarly the thermal treatment may be carried out in a stirred reactor.

In step (c), the mixture obtained at the end of step (b) may optionally be acidified. This step (c) may be performed by using nitric acid. The reaction mixture may be acidified by $HNO_3$ to a pH lower than 3.0, more particularly comprised between 1.5 and 2.5.

In step (d), the solid material obtained at the end of step (b) or step (c) is washed with water, preferably deionized water. This operation makes it possible to decrease the amount of residual nitrates in the dispersion and to obtain the targeted conductivity. This step may be carried out by filtering the solid from the mixture and redispersing the solid in water. Filtration and redispersion may be performed several times if necessary.

In step (e), the solid material obtained at the end of step (d) may be subjected to a mechanical treatment to deagglomerate the particles. The step may be carried out by a double jet treatment or ultrasonic deagglomeration. This step usually leads to a sharp particle size distribution and to a reduction of the number of large agglomerated particles. According to an embodiment, the cerium-based particles have been subjected to the mechanical treatment of deagglomeration. According to another embodiment, the cerium-based particles have not been subjected to the mechanical treatment of deagglomeration.

After step (e), the solid material may be dried to obtain the cerium-based particles in the powder form. After step (e), water or a mixture of water and of a miscible liquid organic compound may also be added to obtain the dispersion of the cerium-based particles in a liquid medium.

It was observed that the particular shape of the particles of the invention could not be obtained with an element other than La (see FIG. 2). The cerium-based particles were obtained with the method of preparation so disclosed. The method is based on the combination of a low $Ce^{IV}$/total Ce ratio, a temperature of the aging substep (ii) between 75° C. and 90° C. and a duration of the aging substep (ii) between 2 h and 20 h. If, for a given temperature of the aging substep, the cerium-based particles are not obtained, the duration of the aging substep can be increased. If the cerium-based particles are still not obtained, the temperature of the aging substep and/or the base/RE molar ratio can be increased. A person skilled in the art can also find a proper teaching in the examples that are disclosed thereafter.

About the Dispersion of the Cerium-Based Particles

The dispersion comprises the cerium-based particles of the invention and a liquid medium. The liquid medium may be water or a mixture of water and of a water-miscible organic liquid. The water-miscible organic liquid should not make the particles precipitate or agglomerate. The water-miscible organic liquid may for instance be an alcohol like isopropyl alcohol, ethanol, 1-propanol, methanol, 1-hexanol; a ketone like acetone, diacetone alcohol, methyl ethyl ketone; an ester like ethyl formate, propyl formate, ethyl acetate, methyl acetate, methyl lactate, butyl lactate, ethyl lactate. The proportion water/organic liquid may be between 80/20 to 99/1 (wt/wt).

The proportion of cerium-based particles in the dispersion may be comprised between 1.0 wt % and 40.0 wt %, this proportion being expressed as the weight of the cerium-based particles over the total weight of the dispersion. This proportion may be comprised between 10.0 wt % and 35.0 wt %.

The dispersion may also exhibit a conductivity lower than 300 µS/cm, more particularly lower than 150 µS/cm, even more particularly lower than 100 µS/cm or 50 µS/cm. The conductivity is measured with a conductimeter 9382-10D of HORIBA, Ltd.

The dispersion may comprise some residual nitrates. The nitrates may be present in the liquid medium and/or adsorbed on the surface of the cerium-based particles. The presence of the nitrates may help obtain some good polishing properties. The presence of residual nitrates adsorbed on the surface of the particles may be confirmed by intrared spectroscopy. The cerium-based particles may contain an amount of residual nitrates adsorbed on the surface lower than 0.20 wt %, this amount being expressed as the being expressed as the weight of nitrate over the total weight of the particles. This amount way be comprised between 0.01 wt % and 0.20 wt %. It may be measured in the following way: the amount of nitrates (amount A) in the liquid medium of the dispersion is measured after removing the particles from the dispersion by filtration with a centrifugal machine. NaOH is added to the dispersion until pH=11.0 and the mixture is left overnight to remove the adsorbed nitrates from the surface of the particles and the amount of nitrates (amount B) in the liquid is measured. The amount of residual nitrates adsorbed is then determined and corresponds to the difference between amount A and amount B.

About the Use of the Cerium-Based Particles or of the Dispersion

The cerium-based particles of the invention or the dispersion of the invention may be used to prepare a polishing composition, more particularly a CMP composition. They are used as a component of a polishing composition, more particularly a CMP composition.

A CMP composition (or chemical-mechanical polishing composition) is a polishing composition used the selective removal of material from the surface of a substrate. It is used in the field of integrated circuits and other electronic devices. Indeed, in the fabrication of integrated circuits and other electronic devices, multiple layers of conducting, semiconducting, and dielectric materials are deposited onto or removed from the surface of a substrate. As layers of materials are sequentially deposited onto and removed from the substrate, the uppermost surface of the substrate may become non-planar and require planarization. Planarizing a surface (or "polishing") the surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization also is useful in forming features on a substrate by removing excess deposited material used to fill the features and to provide an even surface for subsequent levels of metallization and processing.

The substrate that can be polished with a polishing composition or a CMP composition may be for instance a silicon dioxide-type substrates, glass, a semi-conductor or a wafer The polishing composition or the CMP composition usually contains different ingredients other than the cerium-based particles. The polishing composition may comprise one or more of the following ingredients:

abrasive particles other than the cerium-based particles (herein referred to as "additional abrasive particles"); and/or a pH regulator; and/or a surfactant; and/or a rheological control agent, including viscosity enhancing agents and coagulants; and/or an additive selected from an anionic copolymer of a carboxylic acid monomer, a sulfonated monomer, or a phosphonated monomer, and an acrylate, a polyvinylpyrrolidone, or a polyvinylalcohol (e.g., a copolymer of 2-hydroxyethylmethacrylic acid and methacrylic acid); a nonionic polymer, wherein the nonionic polymer is polyvinylpyrrolidone or polyethylene glycol; a silane, wherein the silane is an amino silane, an ureido silane, or a glycidyl silane; an N-oxide of a functionalized pyridine (e.g. picolinic acid N-oxide); a starch; a cyclodextrin (e.g., alpha-cyclodextrin or beta-cyclodextrin), and combinations thereof.

The pH of the polishing composition is generally between 1 to 6. Typically, the polishing composition has a pH of 3.0 or greater. Also, the pH of the polishing composition typically is 6.0 or less.

The cerium-based particles of the invention may be used in the polishing compositions disclosed in the following documents: WO 2013/067696; WO 2016/140968; WO 2016/141259; WO 2016/141260; WO 2016/047725; WO 2016/006553.

EXAMPLES

The cerium-based particles of the examples and comparative examples were all subjected to a mechanical treatment to deagglomerate the particles except the cerium-based particles of example 6. The appliance used was a double impact jet treatment machine.

Example 1: Particles Ce/La 97.5/2.5 (Invention)

A dilute cerium nitrate solution was prepared by adding 13.1 kg of a 3M trivalent cerium nitrate solution, 0.3 kg of 3M lanthanum nitrate solution, 2.0 kg of 68% $HNO_3$ solution, 0.5 kg of deionized water and cerium nitrate (IV) corresponding to a ratio $Ce^{iv}/Ce_{total}=1/81050$. This solution was loaded into a semi-closed 20 L vessel and then degassed with agitation and with nitrogen bubbling.

A dilute aqueous ammonia solution is prepared by adding 75 kg of deionized water and a solution of 13.1 kg of 25% aqueous ammonia ($NH_4OH/(La+Ce)=9.0$). This solution is loaded into a semi-closed 100 L jacketed reactor and then subjected to agitation and nitrogen bubbling.

The diluted cerium nitrate solution is then added, at ambient temperature, to the dilute aqueous ammonia solution, with the same agitation and under nitrogen sweeping. The temperature of the reaction mixture is then increased to 80° C. and then maintained at this temperature for 18 hours. At the end of this heat treatment, the reaction mixture is left to cool and was acidified to pH 2 by adding 68% $HNO_3$.

The reaction mixture was filtrated and washed with deionized water. The washing was repeated when the conductivity of washing solution was less 0.04 mS/cm. The suspension obtained finally was adjusted at 10% of $CeO_2$.

The BET specific surface area determined by nitrogen adsorption was 11.3 $m^2/g$.

The secondary particle size was measured at relative refractive index 1.7 of $CeO_2$ in the water by laser particle sizer (Horiba LA-910). The median size D50 was 129 nm and standard deviation was 31 nm corresponding to 24% of average particle size.

The D10, D50 and D90 were 103, 129 and 174 nm, respectively. The calculated dispersion σ/m was 0.28.

Example 2: Particles Ce/La 90/10 (Invention)

A dilute cerium nitrate solution was prepared by adding 11.5 kg of a 3M trivalent cerium nitrate solution, 1.3 kg of 3M lanthanum nitrate solution, 1.8 kg of 68% $HNO_3$ solution, 0.5 kg of deionized water and cerium nitrate (IV) corresponding to a $Ce^{iv}/Ce_{total}=1/80235$. This solution was loaded into a semi-closed 20 L vessel and then degassed with agitation and with nitrogen bubbling.

A dilute aqueous ammonia solution is prepared by adding 70 kg of deionized water and a solution of 14.0 kg of 25% aqueous ammonia ($NH_4OH/(La+Ce)=10.0$). This solution is loaded into a semi-closed 100 L jacketed reactor and then subjected to agitation and nitrogen bubbling.

The diluted cerium nitrate solution is then added, at ambient temperature, to the dilute aqueous ammonia solution, with the same agitation and under nitrogen sweeping. The temperature of the reaction mixture is then increased to 88° C. and then maintained at this temperature for 13.5 hours. At the end of this heat treatment, the reaction mixture is left to cool and was acidified to pH 2 by adding 68% $HNO_3$.

The reaction mixture was filtrated and washed with deionized water. The washing was repeated when the conductivity of washing solution was less 0.04 mS/cm. The suspension obtained finally was adjusted at 10% of $CeO_2$.

The BET specific surface area determined by nitrogen adsorption was 8.4 $m^2/g$.

The suspension was observed by TEM. The primary particles were monodispersed. For approximately 1000 particles representative of the suspension, each of particles were counted and measured. The average particle size was 156 nm and standard deviation was 39 nm corresponding to 25% of average particle size.

The secondary particle size was measured at relative refractive index 1.7 of $CeO_2$ in the water by laser particle sizer (Horiba LA-910). The median size D50 was 166 nm and standard deviation was 69 nm corresponding to 42% of average particle size. The D10, D50 and D90 were 116, 166 and 267 nm, respectively. The calculated dispersion σ/m was 0.45.

Example 3: Particles Ce/La (97.5/2.5)

The particles were obtained under similar conditions as in example 1. The following parameters were used: $Ce^{iv}/Ce_{total}=1/79799$; $NH_4OH/RE=8.0$; temperature of aging substep: 88° C.; duration of aging substep: 2 h.

Example 4: Particles Ce/La (90/10)

The particles were obtained under similar conditions as in example 1. The following parameters were used: $Ce^{iv}/Ce_{total}=1/82293$; $NH_4OH/RE=9.0$; temperature of aging substep: 80° C.; duration of aging substep: 22 h.

Example 5: Particles Ce/La (90/10)

The particles were obtained under similar conditions as in example 1. The following parameters were used: $Ce^{iv}/$ $Ce_{total}$=1/4982; $NH_4OH$/RE=8.0; temperature of aging substep: 88° C.; duration of aging substep: 8 h.

Example 6: Particles Ce/La (97.5/2.5)

The particles were obtained under similar conditions as in example 1. The following parameters were used: $NH_4OH$/RE=8.0; temperature of aging substep: 88° C.; duration of aging substep: 4 h.

Comparative Example 1 (Pure Ceria)

The cerium nitrate solution was prepared by mixing 13.5 kg of 3M trivalent cerium nitrate, 2.2 kg of 68% $HNO_3$ and 0.7 kg of deionized water. This solution was put into 20 L semi-closed vessel.

The ammonia aqueous solution was prepared by adding 15.5 kg of 25% ammonia water and 73 kg of deionized water. Subsequently cerium nitrate (IV) equivalent with 1/80 000 of cerium IV/total cerium molar ratio ($Ce^{IV}/Ce_{total}$=1/80000) was added. This solution was put into 100 L semi-closed reactor jacketed, and bubbled by $N_2$ gas with the agitation for 1 hour.

The above described cerium nitrate solution was mixed with the ammonia aqueous solution in approximately 30 min in the same conditions of agitation and $N_2$ bubbling. The reaction mixture was heated up to 85° C. in approximately 1 hours and maintained at this temperature for approximately 20 hours at the same conditions of agitation without $N_2$ bubbling.

The reaction mixture was cooled and acidified at pH 2.0 with 68% $HNO_3$. The reaction mixture was filtrated and washed with deionized water. The washing was repeated when the conductivity of washing solution was less 0.04 mS/cm. The suspension obtained finally was deagglomerated and adjusted at 30% of $CeO_2$.

The BET specific surface area determined by nitrogen adsorption was 8 $m^2$/g.

The suspension was observed by TEM. The primary particles were monodispersed. For approximately 150 particles representative of the suspension, each of particles were counted and measured. The average particle size was 165 nm and standard deviation was 25 nm corresponding to 15% of average particle size.

The secondary particle size was measured at relative refractive index 1.7 of $CeO_2$ in the water by laser particle sizer (Horiba LA-910). The median size D50 was 137 nm and standard deviation was 36 nm corresponding to 26% of average particle size. The D10, D50 and D90 were 106, 137 and 192 nm, respectively. The calculated dispersion σ/m was 1.40.

Comparative Example 2: Particles Ce/La (97.5/2.5)

A dilute cerium nitrate solution was prepared by adding 13.1 kg of a 3M trivalent cerium nitrate solution, 0.3 kg of 3M lanthanum nitrate solution, 2.0 kg of 68% $HNO_3$ solution, 0.5 kg of deionized water and cerium nitrate (IV) equivalent with 1/5000 of cerium IV/total cerium molar ratio ($Ce^{IV}/Ce_{total}$=1/5000). This solution was loaded into a semi-closed 20 L vessel and then degassed with agitation and with nitrogen bubbling.

A dilute aqueous ammonia solution is prepared by adding 80 kg of deionized water and a solution of 9.8 kg of 25% aqueous ammonia. This solution is loaded into a semi-closed 100 L jacketed reactor and then subjected to agitation and nitrogen bubbling.

The diluted cerium nitrate solution is then added, at ambient temperature, to the dilute aqueous ammonia solution, with the same agitation and under nitrogen sweeping. The temperature of the reaction mixture is then increased to 80° C. and then maintained at this temperature for 8 hours. At the end of this heat treatment, the reaction mixture is left to cool and was acidified to pH 2 by adding 68% $HNO_3$.

The reaction mixture was filtrated and washed with deionized water. The washing was repeated when the conductivity of washing solution was less 0.04 mS/cm. The suspension obtained finally was adjusted at 10% of $CeO_2$.

The BET specific surface area determined by nitrogen adsorption was 15.3 $m^2$/g.

The secondary particle size was measured at relative refractive index 1.7 of $CeO_2$ in the water by laser particle sizer (Horiba LA-910). The median size D50 was 99 nm and standard deviation was 17 nm corresponding to 17% of average particle size. The D10, D50 and D90 were 80, 99 and 121 nm, respectively. The calculated dispersion σ/m was 0.22.

Comparative Example 3: Particles (Ce/La 90/10)

A dilute cerium nitrate solution was prepared by adding 11.5 kg of a 3M trivalent cerium nitrate solution, 1.3 kg of 3M lanthanum nitrate solution, 1.8 kg of 68% $HNO_3$ solution, 0.5 kg of deionized water and cerium nitrate (IV) equivalent with 1/5000 of cerium IV/total cerium molar ratio. This solution was loaded into a semi-closed 20 L vessel and then degassed with agitation and with nitrogen bubbling.

A dilute aqueous ammonia solution is prepared by adding 80 kg of deionized water and a solution of 8.8 kg of 25% aqueous ammonia. This solution is loaded into a semi-closed 100 L jacketed reactor and then subjected to agitation and nitrogen bubbling.

The diluted cerium nitrate solution is then added, at ambient temperature, to the dilute aqueous ammonia solution, with the same agitation and under nitrogen sweeping. The temperature of the reaction mixture is then increased to 80° C. and then maintained at this temperature for 5 hours. At the end of this heat treatment, the reaction mixture is left to cool and was acidified to pH 2.0 by adding 68% $HNO_3$.

The reaction mixture was filtrated and washed with deionized water. The washing was repeated when the conductivity of washing solution was less 0.04 mS/cm. The suspension obtained finally was adjusted at 10% of $CeO_2$.

The BET specific surface area determined by nitrogen adsorption was 19.0 $m^2$/g.

The suspension was observed by TEM. The primary particles were monodispersed. For approximately 1000 particles representative of the suspension, each of particles were counted and measured. The average particle size was 65 nm and standard deviation was 18 nm corresponding to 28% of average particle size.

The secondary particle size was measured at relative refractive index 1.7 of $CeO_2$ in the water by laser particle sizer (Horiba LA-910). The median size D50 was 86 nm and standard deviation was 11 nm corresponding to 13% of average particle size. The D10, D50 and D90 were 70, 86 and 98 nm, respectively. The calculated dispersion σ/m was 0.16.

Conditions Used for Polishing

The dispersions of the cerium-based particles in water were tested under the following conditions. The polishing machine used is a Struers Labopol 5 comprising a self made polishing head. The surface to be polished is made of amorphous silica. The dispersion is introduced on the surface to be polished under a controlled flow-rate.

pressure applied on the head: 40 kPa;
rotation speed: 150 rpm;
pad: neoprene (MD-Chem)—new pad for every dispersion tested;
flow-rate of the dispersion: 60 mL/min;
dispersion: the amount of cerium-based particles is 1 wt %;
the pH of the dispersion is 4.6-4.8.

The loss of weight of the substrate is recorded. The removal rate (RR) expressed in nm/min is then calculated as:

$$RR = \frac{\Delta m * 10^4}{\pi \cdot R^2 \cdot \rho \cdot \Delta t}$$

wherein:
$\Delta m$ is the weight loss of the substrate;
R radius of the substrate;
$\rho$ density of the substrate;
$\Delta t$ polishing time.

As can be seen from the results detailed in Table I, the particles of the invention exhibit an improvement of the removal rate in comparison to the particles of comparative example 2.

TABLE I

Figure 3:
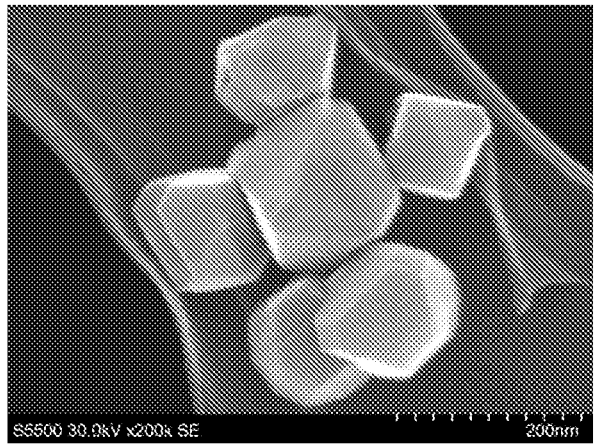
Figure 4:
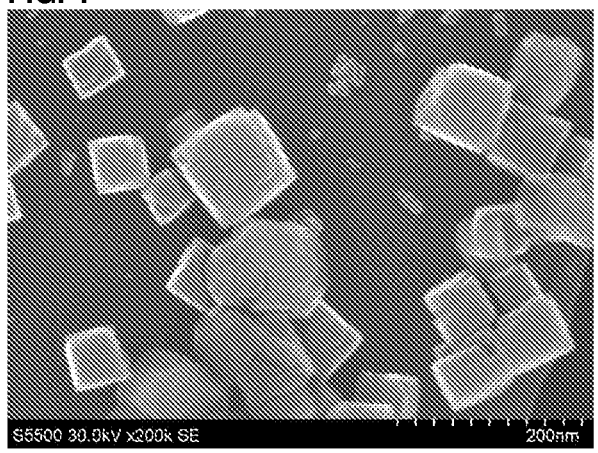
Figure 5:
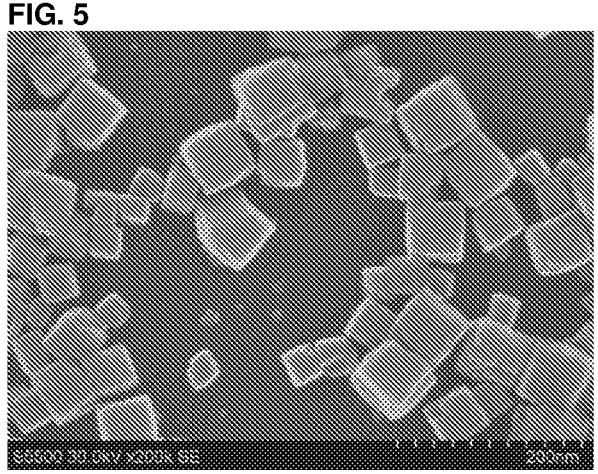
Figure 6:
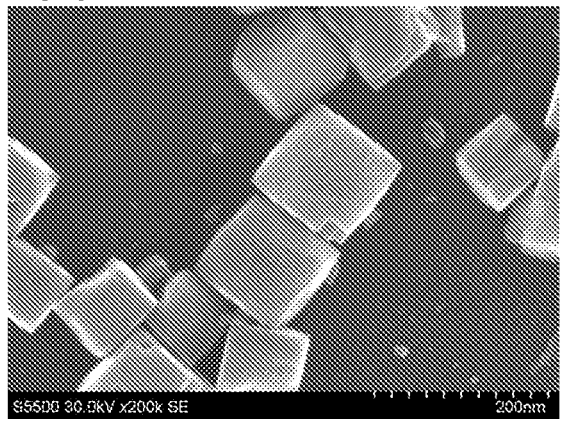
Figure 7:
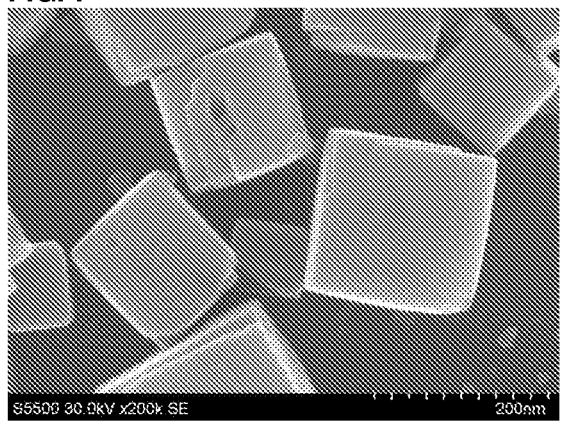

|  |  | dispersion | | | | DLS | Laser diffraction | | | | | morphology of the particles | deagglomeration | removal |
| --- | --- | --- | --- | --- | --- | --- | --- | --- | --- | --- | --- | --- | --- | --- |
|  |  | particles | OH/RE | conductivity | SSA | Dh | D10 | D50 | D90 | D99 | σ/m | (SEM) | in step (e) | rate |
| Comparative examples | 1 | pure ceria | 0.161 | 280 | 8 | 198 | 106 | 137 | 192 | 269 | 0.32 | FIG. 1 polyhedral | yes | / |
|  | 2 | Ce/La 97.5/2.5 | 0.226 | 50 | 15 | 143 | 80 | 99 | 127 | 159 | 0.24 | FIG. 2 cubic-shaped | yes | 195 |
|  | 3 | Ce/La 90/10 | 0.214 | 113 | 19 | 111 | 70 | 86 | 98 | 113 | 0.16 | FIG. 3 cubic-shaped | yes | / |
| Examples | 1 | Ce/La 97.5/2.5 | 0.185 | 35 | 11 | 167 | 103 | 129 | 174 | 242 | 0.28 | FIG. 4 cubic-shaped | yes | 510 |
|  | 2 | Ce/La 90/10 | 0.306 | 108 | 8 | 222 | 116 | 166 | 267 | 439 | 0.45 | FIG. 5 cubic-shaped | yes | 524 |
|  | 3 | Ce/La 97.5/2.5 | 0.342 | 33 | 12 | 229 | 127 | 183 | 286 | 443 | 0.43 | cubic-shaped | yes | / |
|  | 4 | Ce/La 90/10 | 0.244 | 110 | 12 | 157 | 93 | 119 | 163 | 223 | 0.29 | cubic-shaped | yes | / |
|  | 5 | Ce/La 90/10 | 0.411 | 159 | 9 | 222 | 112 | 154 | 236 | 361 | 0.40 | cubic-shaped | yes | / |
|  | 6 | Ce/La 97.5/2.5 | / | / | 9 | / | 367 | 618 | 1080 | 1681 | 0.58 | cubic-shaped | no | / |

SSA: specific surface area in m²/g; conductivity in μS/cm
Dh (median), D10, D50, D90, D99: in nm

The invention claimed is:

1. Particles of a mixed oxide of cerium and of lanthanum having:
a molar ratio La/(La+Ce) comprised between 0.01 and 0.15;
a specific surface area (BET) between 3 and 14 m²/g;
wherein the particles are substantially cubic-shaped such that the particles exhibit, in SEM images, 4 sides having substantially the same length and are such that the adjacent sides of these 4 sides form an angle between 88° and 92%, wherein the 4 sides are 4 edges of a face of the substantially cubic-shaped particles.

2. The particles according to claim 1, wherein the molar ratio La/(La+Ce) is comprised between 0.01 and 0.04.

3. The particles according to claim 1, wherein the mixed oxide is a solid solution.

4. The particles according to claim 1, wherein the particles comprise hydroxyl groups (OH groups) on their surface.

5. The particles according to claim 1, wherein the particles have an hydrodynamic mean diameter Dh determined by dynamic light scattering comprised between 100 nm and 1000 nm.

6. The particles according to claim 1, wherein the particles have a median diameter D50 determined by laser diffraction comprised between 100 nm and 700 nm.

7. The particles according to claim 1, wherein the particles have a diameter D10 determined by laser diffraction comprised between 80 nm and 400 nm.

8. The particles according to claim 1, wherein the particles have a diameter D90 determined by laser diffraction comprised between 150 nm and 1200 nm.

9. The particles according to claim 1, wherein the particles have a diameter D99 determined by laser diffraction comprised between 150 nm and 3000 nm.

10. The particles according to claim 1, wherein the particles have a dispersion index σ/m lower than 0.60, more particularly lower than 0.30, wherein σ/m=(D90-D10)/2D50, D10, D50 and D90 being determined by laser diffraction.

11. The particles according to claim 1, wherein the particles have a ratio D90/D50 comprised between 1.30 and 2.00, D50 and D90 being determined by laser diffraction.

12. The particles according to claim 1, wherein the particles have been subjected to a mechanical treatment of deagglomeration.

13. The particles according to claim 1, wherein the particles have not been subjected to a mechanical treatment of deagglomeration.

14. The particles according to claim 1, wherein the particles comprise nitrates adsorbed on their surface.

15. A dispersion comprising particles according to claim 1 in a liquid medium.

16. The dispersion according to claim 15, wherein the dispersion exhibits a conductivity lower than 300 μS/cm.

17. A polishing composition comprising the particles of claim 1.

18. The polishing composition according to claim 17, further comprising one or more of the following ingredients:
- abrasive particles other than the particles of claim 1; and/or
- a pH regulator; and/or
- a surfactant; and/or
- a rheological control agent, including viscosity enhancing agents and coagulants; and/or
- an additive selected from an anionic copolymer of a carboxylic acid monomer, a sulfonated monomer, or a phosphonated monomer, and an acrylate, a polyvinylpyrrolidone, or a polyvinylalcohol; a nonionic polymer, wherein the nonionic polymer is polyvinylpyrrolidone or polyethylene glycol; a silane, wherein the silane is an amino silane, an ureido silane, or a glycidyl silane; an N-oxide of a functionalized pyridine; a starch; a cyclodextrin, and combinations thereof.

19. A method of preparation of the particles of claim 1, the method comprising:
- (a) contacting under an inert atmosphere, an aqueous solution of a base and an aqueous solution comprising $NO^{3-}$, $Ce^{III}$, $Ce^{IV}$ and $La^{3+}$ wherein the $Ce^{IV}$/total Ce molar ratio is comprised between 1/500 000 and 1/4000;
- (b) subjecting the mixture obtained in step (a) to a thermal treatment under an inert atmosphere;
- (c) optionally, acidifying the mixture obtained at the end of step (b);
- (d) washing the solid material obtained at the end of step (b) or step (c) with water;
- (e) optionally, subjecting the solid material obtained at the end of step (d) to a mechanical treatment to deagglomerate the particles.

* * * * *